United States Patent [19]

Takayama et al.

[11] Patent Number: 5,382,619
[45] Date of Patent: Jan. 17, 1995

[54] POLYMERIZABLE COMPOSITIONS AND IN-MOLD CURED PRODUCTS USING SAME

[75] Inventors: Yuji Takayama, Kanagawa; Hirokazu Matsueda, Aichi; Masato Sugiura, Aichi; Tatsuhiko Ozaki, Aichi; Hirotaka Wada, Aichi; Toshiharu Suzuki, Aichi; Iwao Komiya, Aichi, all of Japan

[73] Assignee: Takemoto Yushi Kabushiki Kaisha, Aichi, Japan

[21] Appl. No.: 54,554

[22] Filed: Apr. 28, 1993

[30] Foreign Application Priority Data

Feb. 5, 1993 [JP] Japan .................. 5-042003

[51] Int. Cl.⁶ ............ C08K 3/22; C08L 39/00; C08F 271/00; C08F 226/02
[52] U.S. Cl. .................. 524/437; 524/555; 525/278; 526/301
[58] Field of Search ......... 524/437, 555, 507, 521, 524/534, 535; 525/278, 455, 920; 526/301; 528/59

[56] References Cited

U.S. PATENT DOCUMENTS

| | | | |
|---|---|---|---|
| 4,374,229 | 2/1983 | Dunnavan et al. | 525/28 |
| 4,480,079 | 10/1984 | Orton et al. | 526/301 |
| 4,829,120 | 5/1989 | Yabuta | 525/450 |
| 5,185,417 | 2/1993 | Takayama et al. | 526/301 |
| 5,223,565 | 6/1993 | Takayama et al. | 524/437 |
| 5,237,029 | 8/1993 | Takayama et al. | 526/301 |

*Primary Examiner*—Peter Szekely
*Attorney, Agent, or Firm*—Heller, Ehrman, White & McAuliffe

[57] ABSTRACT

A polymerizable composition contains unsaturated urethane shown by Formula (1) given below, vinyl monomer which is copolymerizable with this unsaturated urethane, and an inorganic powder filler at weight ratio of (unsaturated urethane)/(vinyl monomer)=10/90-90/10, the inorganic powder filler being 30-300 weight parts with respect to 100 weight parts of the sum of the unsaturated urethane and vinyl monomer:

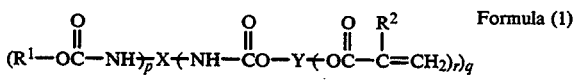

where X is a residual group obtained by removing isocyanate groups from polyisocyanate; Y is a residual group obtained by removing hydroxyl groups from polyol; $R^1$ is a residual group obtained by removing hydroxyl group from non-radical polymerizable monool having aliphatic hydrocarbon group with 6–22 carbon atoms; $R^2$ is H or $CH_3$; and p, q and r are each an integer 1–3 such that $2 \leq p+q \leq 4$ and $qr \geq 2$. In-mold cured products obtained from such a polymerizable composition have superior external appearance and water-resistance, and their mold shrinkage is small.

18 Claims, No Drawings

POLYMERIZABLE COMPOSITIONS AND IN-MOLD CURED PRODUCTS USING SAME

BACKGROUND OF THE INVENTION

This invention relates to polymerizable compositions and in-mold cured products obtained from such compositions.

Polymerizable compositions containing polymerizable liquid resins are widely in use. For example, molded products using polymerizable compositions containing unsaturated polyester resin, which is a representative kind of polymerizable liquid resin, are being used as external panels and accessories of automobiles. There are a number of molding methods available for obtaining in-mold cured objects from polymerizable compositions, including the compression molding which uses sheet molding compound (SMC), the injection molding which uses bulk molding compound (BMC), the hand lay-up method whereby polymerizable compositions impregnate a reinforcing fiber mat, textile or strands and are hardened, the pultrusion method, and the resin transfer molding (RTM) and reaction injection molding (RIM) methods whereby a polymerizable composition is introduced into a mold for quick in-mold curing.

As examples of prior art polymerizable compositions containing unsaturated urethane, Japanese Patent Publication Tokkai 57-182312 and Japanese Patent Publication Tokkai 61-225210 have disclosed compositions containing polymerizable liquid resins comprising unsaturated urethane and alkyl (meth)acrylate obtained from polyisocyanate and hydroxyl alkyl (meth)acrylate.

The aforementioned prior art polymerizable compositions, however, have the following disadvantages because of their use of unsaturated urethane obtained from polyisocyanate and hydroxy alkyl (meth)acrylate:

(1) Since unsaturated urethane and alkyl (meth)acrylate, which are obtained together by such a prior art method, are not sufficiently compatible with respect to each other, sedimentation and separation are likely to occur especially at low temperatures;

(2) Since unsaturated urethane thus obtained contains many urethane bonds within its molecule, it is inferior in water resistance, like most other kinds of polyurethane liquid resin, as compared to other thermosetting polymerizable compositions. This limits the use of the in-mold cured products obtained therefrom; and (3) Since the density of cross-links is high in such in-mold cured products, mold shrinkage at the time of their curing is large compared to unsaturated polyester liquid resins. As a result, generation of cracks and appearance of fiber patterns are prominently observed. Low shrinkage agents may be used for preventing such phenomena but they are not very effective.

SUMMARY OF THE INVENTION

The basic object of the present invention is to eliminate the disadvantages (1)–(3) given above related to prior art polymerizable compositions containing unsaturated urethane.

In other words, it is an object of the present invention to provide polymerizable compositions comprising unsaturated urethane and vinyl monomers with improved compatibility with respect to each other.

It is another object of the present invention to provide polymerizable compositions which comprise unsaturated urethane having higher aliphatic hydrocarbon groups and have improved water resistance.

It is still another object of the present invention to provide polymerizable compositions from which in-mold cured objects with lower density of cross-links can be obtained.

It is a further object of the present invention to provide in-mold cured products which are made from such polymerizable compositions and on which cracks and fiber patterns do not show easily.

In view of the above and other objects, the present inventors have conducted research on polymerizable compositions comprising unsaturated urethane, vinyl monomers which can be copolymerized therewith and inorganic fillers in a powder form, as well as in-mold cured products obtained from such polymerizable compositions. As a result of research, in particular, on the relationship between the chemical structure of unsaturated urethane and the characteristics of in-mold cured products which are obtained, it has been discovered that it is preferable to use, at a specified ratio, unsaturated urethane having introduced thereinto specified amounts of radical polymerizable groups comprising (meth)acryloyl groups and hydrophobic groups including long-chain aliphatic hydrocarbon groups.

DETAILED DESCRIPTION OF THE INVENTION

This invention relates to polymerizable compositions comprising unsaturated urethane shown by Formula (1) given below, vinyl monomer which is copolymerizable with this unsaturated urethane, and an inorganic powder filler at the weight ratio of (unsaturated urethane)/(vinyl monomer)=10/90–90/10, the inorganic powder filler being 30–300 weight parts with respect to 100 weight parts of the sum of the unsaturated urethane and vinyl monomer. This invention also relates to in-mold cured products obtained by using such compositions:

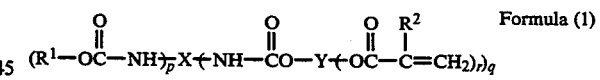

Formula (1)

where X is a residual group obtained by removing isocyanate groups from polyisocyanate; Y is a residual group obtained by removing hydroxyl groups from polyol; $R^1$ is a residual group obtained by removing hydroxyl group from non-radical polymerizable mono-ol having aliphatic hydrocarbon group with 6–22 carbon atoms; $R^2$ is H or $CH_3$; and p, q and r are each an integer 1–3 such that $2 \leq p+q \leq 4$ and $qr \geq 2$.

The unsaturated urethane shown by Formula (1) for polymerizable compositions of the present invention is a urethane compound obtained by reacting (meth)acryl ester mono-ol to be described below and non-radical polymerizable mono-ol having long-chain aliphatic hydrocarbon group with 6–22 carbon atoms (hereinafter referred to simply as mono-ol containing long-chain aliphatic group) with polyisocyanate.

Aforementioned (meth)acryl ester mono-ol is a partial ester having one free hydroxyl group and can be derived from (meth)acrylic acid and dihydric-tetrahydric polyol.

Examples of such (meth)acryl ester mono-ol include (1) mono(meth)acrylates of dihydric alcohol such as 2-hydroxyethyl acrylate, 2-hydroxyethyl methacrylate, 2-hydroxypropyl methacrylate, 4-hydroxybutyl methacrylate, and 1,6-hexanediol monoacrylate; (2) di(meth)acrylates of trihydric alcohol such as glycerine diacrylate, glycerine dimethacrylate, trimethylol propane dimethacrylate, 5-methyl-1,2,4-heptane triol dimethacrylate, and 1,2,6-hexane triol dimethacrylate; (3) tri(meth)acrylates of tetrahydric alcohol such as pentaerythritol triacrylate and pentaerythritol trimethacrylate; (4) di(meth)acrylates of (poly)ether triol such as ethyleneglycol monoglycerylether dimethacrylate, (poly)ethoxylated trimethylol propane dimethacrylate, (poly)propoxylated trimethylol propane diacrylate, and (poly)ethoxylated glycerine; and (5) tri(meth)acrylates of (poly)ether tetraol such as diglycerine triacrylate, (poly)ethoxylated pentaerythritol trimethacrylate, and ethyleneglycol diglycerylether trimethacrylate. Among the dihydric-tetrahydric polyols to be used for deriving such (meth)acryl ester mono-ols, those with molecular weight 100 or less per hydroxyl group contained in the molecule are preferred and those with molecular weight 80 or less are even more preferred.

The aforementioned mono-ols containing long-chain aliphatic group are each a mono-ol containing a straight chain aliphatic hydrocarbon group, an aliphatic hydrocarbon group having a branched chain or an unsaturated aliphatic hydrocarbon group with 6-22 carbon atoms. Examples of such mono-ol containing long-chain aliphatic group include (1) saturated or unsaturated straight-chain higher alcohols such as hexanol, decanol, tetradecanol, octadecanol, and oleyl alcohol; (2) branched higher alcohols such as 2-ethyl hexanol, isononyl alcohol and isotridecyl alcohol; (3) alkoxy (poly)alkylene glycols obtained by adding alkylene oxide with 2-4 carbon atoms such as ethylene oxide, propylene oxide and butylene oxide to such straight-chain or branched-chain higher alcohol; (4) alkylphenoxy (poly)alkylene glycols such as nonylphenoxy ethanol, octylphenoxyethoxy ethanol, and dodecylphenoxy propanol; (5) (poly)alkyleneglycol monoesters of aliphatic acid such as ethyleneglycol monooctanoate, propyleneglycol monoisonanoate, and dipropyleneglycol monooleate; (6) diesters of trihydric alcohol such as glycerine dilaurate, glycerine dioleate, trimethylol propane dioctanoate, and trimethylolethane diisononanoate; and (7) esters of monohydroxy carboxylic acid such as methyl ricinolate, 12-hydroxyethyl stearate and isotridecyl glycolate.

Examples of polyisocyanate to be reacted with aforementioned (meth)acryl ester mono-ol and mono-ol containing long-chain aliphatic group include (1) diisocyanates such as many kinds of tolylene diisocyanate, methylene-bis-(4-phenyl isocyanate), and hexamethylene diisocyanate; (2) triisocyanate such as Kolonate EH (trade name of hexamethylene diisocyanate cyclic trimer produced by Nippon Polyurethane Industry, Co., Ltd.) and Kolonate HL (trade name of reaction product between hexamethylene diisocyanate and trimethylol propane at molar ratio 3/1 produced by Nippon Polyurethane Industry, Co., Ltd.); and polyisocyanates containing an average of 3-4 isocyanate groups in the molecule such as Millionate MR (trade name of polymethylene polyphenyl polyisocyanate produced by Nippon Polyurethane Industry, Co., Ltd.).

As explained above, the unsaturated urethane, which is used according to the present invention, is a urethane composition obtained by reacting (meth)acryl ester mono-ol and mono-ol containing long-chain aliphatic group with polyisocyanate. It is preferred that the ratio of reacting polyisocyanate to (meth)acryl ester mono-ol and mono-ol containing long-chain aliphatic group for the synthesis of aforementioned unsaturated urethane be 1/1 by molar ratio of functional groups (NCO/OH), but no particular ill-effects are encountered if the ratio is varied within the range of 1/0.95–0.95/1.

According to accepted methods of synthesizing unsaturated urethane, an inactive solvent is added to a mixture of (meth)acryl ester mono-ol and mono-ol containing long-chain aliphatic group. A catalyst such as tertiary amine, metallic salts or preferably di-n-butyl tin dilaurate, all of which are well known for the synthesis of polyurethane, is used, and polyisocyanate is gradually added while temperature is maintained at 30°–80° C. In this situation, it is preferable to use a vinyl monomer such as alkyl (meth)acrylate or styrene as the inactive solvent because there will then be no need to remove it after the reaction.

There is no particular limitation as to the kind of vinyl monomers to be used as reaction dilutant for unsaturated urethane in connection with polymerizable compositions of the present invention, as long as they are copolymerizable with the unsaturated urethane. Examples of such vinyl monomers include (1) alkyl (meth)acrylates such as methyl methacrylate, methyl acrylate, ethyl methacrylate and ethyl acrylate, (2) vinyl aromatic hydrocarbons such as styrene, methyl styrene and divinyl benzene, and (3) diallyl phthalate. They may be used singly or as a mixture of two or more. From the point of view of the properties of the in-mold cured products to be obtained, however, methyl methacrylate, styrene and their mixtures are preferable.

In the polymerizable compositions according to the present invention, preferable weight ratio between the unsaturated urethane and the vinyl monomers which are copolymerizable therewith (unsaturated urethane)/(vinyl monomer) is 10/90–90/10 and, more preferably, 40/60–75/25. If this ratio is smaller than 10/90, the curing speed of the polymerizable composition is too low and the physical properties of the in-mold cured products obtained therefrom are poor. If it exceeds 90/10, on the other hand, viscosity of the polymerizable composition is too high and the in-mold curing process becomes difficult.

The unsaturated urethane contained in polymerizable compositions according to the present invention has within its molecule at least two radical polymerizable double bonds and at least one long-chain aliphatic hydrocarbon group. The number of such double bonds contained in a molecule and the molecular weight of the unsaturated urethane per double bond affect the speed of its curing speed. In order to obtain a practically convenient curing reaction speed, the unsaturated urethane should be such that its molecular weight per such double bond be 550 or less and, more preferably, in the range of 300–450.

The mixtures of unsaturated urethane and vinyl monomer according to the present invention (hereinafter referred to simply as liquid resins) do not develop precipitation or separation even at a cooler temperature and are generally stable because of superior compatibility between the unsaturated urethane and the vinyl monomer. In-mold cured products from polymerizable compositions of the present invention comprising such liquid resins and their mixtures with an inorganic powder filler have reduced problems related to water resistance and mold shrinkage.

In order to have such characteristics clearly manifested, long-chain aliphatic hydrocarbon groups with 6-22 carbon atoms are introduced according to the present invention into the unsaturated urethane molecules. Particularly preferable examples of such long-chain aliphatic hydrocarbon group include alkyl and isoalkyl groups with 6-18 carbon atoms. It is also preferred that the number of long-chain aliphatic hydrocarbon groups to be introduced be 1-2 for each (meth-)acryl group contained in the molecule of unsaturated urethane and they be contained at the rate of 15-35 weight %. If aliphatic hydrocarbon groups with less than 6 carbon atoms are introduced into the unsaturated urethane molecule, water resistance and mold shrinkage become poorer.

Polymerizable compositions according to the present invention contain both aforementioned polymerizable composition and an inorganic powder filler. The ratio of the inorganic powder filler is 30-300 weight parts to 100 weight parts of the liquid resins. The amount of such inorganic powder filler to be contained varies according to its kind, particle size, the molding method of the liquid resins and the desired properties of the molded products obtained by curing. In general, however, the preferred ratio is 100-300 weight parts to 100 weight parts of the liquid resins.

Examples of inorganic powder filler include alumina trihydrate ($Al_2O_3 \cdot 3H_2O$), calcium carbonate, silica and calcium sulfate dihydrate ($CaSO_4 \cdot 2H_2O$). If use is made of a material containing water of crystallization, or alumina trihydrate in particular, flame-retarding property can be gained by the in-mold cured products which are obtained.

Many known methods of preparing polymerizable compositions containing unsaturated polyester resins can be used for the preparation of polymerizable compositions of the present invention.

In-mold cured products according to the present invention are obtained by in-mold curing of polymerizable compositions of the present invention. In-mold curing methods known for polymerizable compositions containing unsaturated polyester resins can be applied. For example, curing agents and curing accelerators of many kinds can be used for radical polymerization.

Examples of curing agent include benzoyl peroxide, t-butyl peroxy-2-ethyl hexanoate, t-butyl peroxy benzoate, 1,1-di-t-butyl peroxy-3,3,5-trimethyl cyclohexane, and bis(4-t-butyl cyclohexyl) peroxy dicarbonate. They may be used singly or as a mixture of two or more. Examples of curing accelerator include tertiary amines such as N,N-dimethyl-p-toluidine and N,N-dimethyl aniline. The curing agent is normally used at the rate of 1-5 weight % with respect to the whole of the polymerizable composition of the invention. A mold releasing agent may also be used in the case of in-mold curing. Examples of such mold releasing agent include metallic soap of, say, zinc stearate, and Zelec UN (which is a trade name for phosphoric ester produced by E. I. dupont de Nemours and Co.).

Polymerizable compositions of the present invention can be easily cured and molded by any of the in-mold curing methods such as the pultrusion method, the injection molding by the use of BMC, the compression molding by using SMC, the resin transfer molding, and the reaction injection molding.

As in-mold cured products are obtained from polymerizable compositions according to the present invention, reinforcing fibers may be caused to be contained for the purpose of adding strength to the product. Such methods of strengthening in-mold cured products include preliminarily setting reinforcing fibers inside the mold in the form of a mat, textile or strands and bringing a polymerizable composition and a curing agent thereinto, or preliminarily impregnating reinforcing strands with a polymerizable composition with a curing agent added thereto and using them in in-mold curing. Examples of reinforcing fibers include glass fibers, carbon fibers and aramid fibers.

For the purpose of obtaining polymerizable compositions with mold shrinkage even more reduced, it is preferred to increase the contents of inorganic powder filler and reinforcing fibers as much as possible. It is preferred to make the content of inorganic powder filler 100-300 weight parts to 100 weight parts of liquid resins, and more preferably 150-300 weight parts such that the volume ratio of the reinforcing fibers inside the in-mold cured product over 30 volume %, and more particularly 40-70 volume %. In order to obtain in-mold cured products with such high contents of inorganic powder filler and reinforcing fibers, it is most advantageous to make use of a pultrusion method. A high level of flame retarding property can be provided to the in-mold cured products by pultrusion if alumina trihydrate is used as inorganic powder filler and nonorganic fibers such as glass fibers, carbon fibers or steel fibers are used as reinforcing fibers.

The present invention will be described next by way of examples such that its characteristics and effects can be more clearly understood, but the present invention is not intended to be limited by these examples. In what follows, weight parts will be simply referred to as parts, and weight % will be simply referred to as % except regarding glass content and oxygen index.

Tests and Results

Test Series 1

Synthesis of Unsaturated Urethane A and Preparation of Liquid Resin a

Methyl methacrylate 201 parts, glycerine dimethacrylate 114 parts (0.50 moles), isotridecyl alcohol 76 parts (0.38 moles) and di-n-butyl tin dilaurate 1 part were taken inside a reaction vessel and stirred while temperature was kept at 50° C. Polymethylene polyphenyl polyisocyanate (Millionate MR-100, trade name of Nippon Polyurethane Industry, Co., Ltd., containing an average of 3.5 isocyanate groups per molecule) 112 parts was dropped thereinto over a period of 40 minutes. Although reaction heat was generated at this moment, the reaction temperature was kept below 60° C. The synthesis was completed thereafter by keeping it for 1 hour at 60° C. What was obtained was Liquid Resin a containing Unsaturated Urethane A. Although Liquid Resin a thus obtained was left for 24 hours at room temperature, there was no separation of solid components or clouding observed.

Synthesis of Unsaturated Urethane B and Preparation of Liquid Resin b 2-hydroxyethyl methacrylate 82 parts (0.63 moles), propylene glycol monooleate 85 parts (0.25 moles), methyl methacrylate 184 parts, di-n-butyl tin dilaurate 1 part and polymethylene polyphenyl polyisocyanate (the same as above for Unsaturated Urethane A) 112 parts (0.25 moles) were used similarly as described above for the case of Unsaturated Urethane A to obtain Liquid Resin b containing Unsaturated Urethane B by 60%. Liquid Resin b thus obtained was left for 24 hours at room temperature but there was no separation of solid components or clouding observed.

Synthesis of Unsaturated Urethane E and Preparation of Liquid Resin e

Glycerine dimethacrylate 114 parts (0.5 moles), nonylphenoxy ethanol 132 parts (0.5 moles), styrene 222 parts and di-n-butyl tin dilaurate 1 part were taken into a reaction vessel and stirred while temperature was kept at 50° C. Use was made thereafter of 2,4- and 2,6-mixed tolylene diisocyanate (Kolonate T-80, trade name of Nippon Polyurethane Industry, Co., Ltd.) 87 parts (0.5 moles) to obtain Liquid Resin e containing Unsaturated Urethane E by 60% similarly as described above for the case of Unsaturated Urethane A. Liquid Resin e thus obtained was left for 24 hours at room temperature but there was no separation of solid components or clouding observed.

Similarly, Liquid Resin c containing Unsaturated Urethane C by 60%, Liquid Resin d containing Unsaturated Urethane D by 60% and Liquid Resin f containing Unsaturated Urethane F by 60% were obtained. Liquid Resins c, d and f were left for 24 hours at room temperature but there was no separation of solid components or clouding observed.

Synthesis of Unsaturated Urethane R-1 and Preparation of Liquid Resin r-1

2-hydroxyethyl methacrylate 91 parts (0.7 moles), methyl methacrylate 120 parts, di-n-butyl tin dilaurate 1 part and polymethylene polyphenyl polyisocyanate (the same as above for Unsaturated Urethane A) 89 parts (0.2 moles) were used similarly as described above for the case of Unsaturated Urethane A to obtain Liquid Resin r-1 containing Unsaturated Urethane R-1 by 60%.

Clouding occurred in Liquid Resin r-1 thus obtained after it was left for 24 hours at room temperature.

Synthesis of Unsaturated Urethane R-2 and Preparation of Liquid Resin r-2

2-hydroxyethyl methacrylate 130 parts (1.0 mole), styrene 145 parts, di-n-butyl tin dilaurate 1 part and 2,4- and 2,6-mixed tolylene diisocyanate (the same as above for Unsaturated Urethane E) 87 parts (0.5 moles) were used similarly as described above for the case of Unsaturated Urethane E to obtain Liquid Resin r-2 containing Unsaturated Urethane R-2 by 60%. Liquid Resin r-2 thus obtained was left for 24 hours at room temperature and it became a paste-like semi-solid object.

The kinds of polyisocyanate, (meth)acryl ester monool, mono-ol containing long-chain aliphatic group and vinyl monomer which were used in the syntheses and the amounts of their use are shown together in Table 1. Obtained unsaturated urethanes are described in Table 2.

TABLE 1

| UU | Polyisocyanate | | (Meth)acryl ester | | Monool containing long-chain aliphatic group | | Vinyl monomer | |
|---|---|---|---|---|---|---|---|---|
| A | MPI | 112 (0.25) | GDM | 114 (0.5) | *1 | 76 (0.38) | MMA | 201 |
| B | MPI | 112 (0.25) | HEMA | 82 (0.63) | *2 | 85 (0.25) | MMA | 186 |
| C | HMDI | 84 (0.5) | TMP-DM | 135 (0.5) | *3 | 172 (0.5) | MMA | 260 |
| D | MPI | 112 (0.25) | DEMA | 110 (0.63) | *1 | 49 (0.25) | MMA | 181 |
| E | TDI | 87 (0.5) | GDM | 114 (0.5) | *4 | 132 (0.5) | ST | 222 |
| F | MPI | 112 (0.25) | HEMA | 82 (0.63) | *5 | 78 (0.25) | ST | 181 |
| R-1 | MPI | 89 (0.2) | HEMA | 91 (0.7) | — | — | MMA | 120 |
| R-2 | TDI | 87 (0.5) | HEMA | 130 (1.0) | — | — | ST | 145 |

Notes:
Used amounts are in units of weight part (upper line) and mole (lower line)
UU: Unsaturated urethane;
MPI: Polymethylene polyphenyl polyisocyanate (average 3.5 NCO);
HMDI: Hexamethylene diisocyanate;
TDI: Tolylene diisocyanate;
GDM: Glycerine dimethacrylate;
HEMA: 2-hydroxyethyl acrylate;
TMP-DM: Trimethylol propane dimethacrylate;
DEMA: Diethylene glycol monomethacrylate;
*1: Isotridecyl alcohol;
*2: Propylene glycol monooleate;
*3: Glycerine dioctanoate;
*4: Nonylphenoxy ethanol;
*5: Methylricinolate;

TABLE 2

| Type of unsaturated urethane | Molecular weight (a) | Number of double bonds (b) | a/b | Weight % of alkyl groups |
|---|---|---|---|---|
| A | 1203 | 4 | 301 | 15 |
| B | 1112 | 2.5 | 445 | 23 |
| C | 782 | 2 | 391 | 25 |
| D | 1082 | 2.5 | 433 | 17 |
| E | 666 | 2 | 333 | 21 |
| F | 1084 | 2.5 | 434 | 22 |
| R-1 | 902 | 3.5 | 258 | 0 |
| R-2 | 434 | 2 | 217 | 0 |

Test Series 2

Test Examples 1-6 and Comparison Examples 1-4

(Preparation of Polymerizable Production of In-Mold Cured Products Molding (RTM), and Evaluation Thereof)

Polymerizable compositions were prepared by using the liquid resins obtained in Test Series 1 as shown in Table 3 and mixtures were produced by adding an additive comprising a curing accelerator, a mold releasing agent and a low shrinkage agent as shown also in Table 3. On the other hand, a glass strand continuous mat (Unifilo U-750, trade name of Nippon Electric Glass Co., Ltd.) was set in a nickel metallized mold heated to 35° C. such that the glass content would be 25% and the mold was tightened to 2.5 kg/cm². Thereafter, specified amounts of the aforementioned mixtures and radical initiator solutions were injected at the rate shown in Table 3 into the mold by using measuring pumps through a static mixer to form uniform mixtures. The injection was stopped at the point in time when the injected liquid began to flow out from a clearance opposite from the injection opening. The product was taken out of the mold 20 minutes after the injection was stopped.

For each in-mold cured product thus obtained, fiber patterns and occurrence of cracks were visually examined. The results are also shown in Table 3.

uniformly mixed together and poured into this mold. The mold was placed inside a thermostat of 35° C. and it was left overnight at 80° C. to obtain molded products.

Test pieces of length 80 mm, width 25 mm and thickness 3 mm were prepared by using a diamond cutter to cut these molded products. After these test pieces were accurately weighed, they were immersed in warm water of 80° C. for 30 hours. After they were taken out, their external appearance was examined regarding whitening and occurrence of cracks. The weight of each test piece was compared before and after the testing to calculate the water absorbing capacity according to the formula given below. The flexural strength was also measured according to JIS-K6911 (Japanese Industrial Standards) to determine the lowering in flexural strength by the formula given bellow.

Water absorbing capacity (%) = {((Weight after testing) − (Weight before testing))/(Weight before testing)} × 100.
Lowering in flexural strength (%) = {((Strength before testing) − (Strength after testing))/(Strength before testing)} × 100.

These test results are also shown in Table 4, in which the water absorbing capacity and the lowering in flexural strength are shown by an average of n=3 measured values.

Test Examples 13-19 and Comparison Examples 9-12

TABLE 3

| | Test Examples | | | | | | Comparison Examples | | | |
|---|---|---|---|---|---|---|---|---|---|---|
| | 1 | 2 | 3 | 4 | 5 | 6 | 1 | 2 | 3 | 4 |
| {Mixture} (Polymerizable composition) | | | | | | | | | | |
| Liquid Resin | a | b | c | d | e | f | r-1 | r-2 | r-1 | r-2 |
| | 100 | 100 | 100 | 100 | 100 | 100 | 100 | 100 | 100 | 100 |
| Alumina trihydrate (Additives) | 50 | 100 | 150 | 150 | 200 | 100 | 50 | 100 | 100 | 150 |
| Curing accelerator | *4 | *4 | *4 | *4 | *4 | *4 | *4 | *4 | *4 | *4 |
| Mold releasing agent | 0.5 | 0.5 | 0.5 | 0.5 | 0.5 | 0.5 | 0.5 | 0.5 | 0.5 | 0.5 |
| Low shrinking agent | — | — | — | — | — | — | — | — | 40 | 40 |
| {Radical initiator} *5 | 2.0 | 2.0 | 2.0 | 2.0 | 2.0 | 2.0 | 2.0 | 2.0 | 2.0 | 2.0 |
| {Results} | | | | | | | | | | |
| Fiber patterns | No | No | No | No | No | No | Yes | Yes | Yes | Yes |
| Occurrence of cracks | No | No | No | No | No | No | Yes | Yes | Yes | Yes |

Notes:
Numbers in units of weight part;
Liquid resins: Type (upper line), weight part (lower line);
Curing accelerator: N,N-dimethyl-p-toluidine
Mold releasing agent: Mold Wiz (produced by Kozakura Shokai Co., Ltd.)
Low shrinking agent for Comparison Example 3: 40 parts of polyvinyl acetate (molecular weight = 200,000) dissolved in 60 parts of methyl methacrylate
Low shrinking agent for Comparison Example 4: 33.3 parts of polypropylene adipate (molecular weight = 5000) dissolved in 66.7 parts of styrene
*4: 0.075
*5: 50% solution of dibenzoyl peroxide (Nyper BMT-M produced by Nippon Oil and Fats Co., Ltd.)
Spots of phase-separated portions of low shrinking agents were observed on the surfaces of molded products from Comparison Examples 3 and 4.

Test Examples 7-12 and Comparison Examples 5-8

(Preparation of Polymerizable Compositions, Production of In-Mold Cured Products by Cast Moldings and Evaluation Thereof)

Polymerizable compositions were prepared by using the liquid resins obtained in Test Series 1 as shown in Table 4 and mixtures were produced by adding an additive comprising a curing accelerator, a mold releasing agent and a low shrinkage agent as shown also in Table 3. On the other hand, a polyethylene tube of outer diameter 5 mm was sandwiched between two glass sheets (25 cm×25 cm) of thickness 5 mm to form a mold with a clearance of 3 mm. The polymerizable compositions and radical initiator solutions shown in Table 4 were (Preparation of Polymerizable Compositions, Production of In-Mold Cured Products by Pultrusion, and Evaluation Polymerizable compositions were prepared by using the liquid resins obtained in Test Series 1 as shown in Table 5 and mixtures were produced by adding an additive comprising a radical initiator and a mold releasing agent as shown in Table 5. After these mixtures were soaked in glass roving as shown in Table 5, they were passed through a flat mold of dimensions 25 mm×3 mm×400 mm for pultrusion molding at the speed of 20 cm/minute to obtain in-mold cured products in a continuous planar form.

TABLE 4

|  | Test Examples | | | | | | Comparison Examples | | | |
|---|---|---|---|---|---|---|---|---|---|---|
|  | 7 | 8 | 9 | 10 | 11 | 12 | 5 | 6 | 7 | 8 |
| {Mixture} (Polymerizable composition) | | | | | | | | | | |
| Liquid Resin | a | b | c | d | e | f | r-1 | r-2 | r-1 | r-2 |
|  | 100 | 100 | 100 | 100 | 100 | 100 | 100 | 100 | 100 | 100 |
| Alumina trihydrate (Additives) | 50 | 50 | 50 | 50 | 50 | 50 | 50 | 50 | 50 | 50 |
| Curing accelerator | *4 | *4 | *4 | *4 | *4 | *4 | *4 | *4 | *4 | *4 |
| Mold releasing agent | 0.5 | 0.5 | 0.5 | 0.5 | 0.5 | 0.5 | 0.5 | 0.5 | 0.5 | 0.5 |
| Low shrinking agent | — | — | — | — | — | — | — | — | 40 | 40 |
| {Radical initiator} *5 | 2.0 | 2.0 | 2.0 | 2.0 | 2.0 | 2.0 | 2.0 | 2.0 | 2.0 | 2.0 |
| {Results} | | | | | | | | | | |
| Whitening or cracks | No | No | No | No | No | No | Yes | Yes | Yes | Yes |
| Water absorbing capacity | 0.8 | 0.4 | 0.4 | 0.7 | 0.6 | 0.6 | 3.0 | 2.7 | 3.7 | 3.6 |
| Lowering in flexural strength | 15.0 | 12.1 | 11.8 | 14.4 | 12.5 | 13.4 | 38.5 | 35.4 | 41.0 | 40.1 |

Notes:
See Notes to Table 3 regarding liquid resins, curing accelerator, mold releasing agent, *4 and *5.

For each in-mold cured product thus obtained, fiber patterns and occurrence of warping were visually examined. Additionally, test pieces of length 100mm, width 6.5mm and thickness 3mm were prepared by using a diamond cutter to cut these molded products. The oxygen index method of testing flammability of polymeric materials according to JIS-K7201 (Japanese Industrial Standards) was carried out on these test pieces. The results of these tests are shown in Table 5.

As is clear from the above, the present invention has the effects of providing polymerizable compositions containing liquid resins which do not generate solids or turbidity and have superior compatibility, as well as products with improved appearance and water-resistance and small mold shrinkage obtainable by in-mold curing of these polymerizable compositions.

TABLE 5

|  | Test Examples | | | | | | Comparison Examples | | | |
|---|---|---|---|---|---|---|---|---|---|---|
|  | 13 | 14 | 15 | 16 | 17 | 18 | 9 | 10 | 11 | 12 |
| {Mixture} (Polymerizable composition) | | | | | | | | | | |
| Liquid Resin | a | a | c | c | e | f | a | r-1 | r-1 | r-2 |
|  | 100 | 100 | 100 | 100 | 100 | 100 | 100 | 100 | 100 | 100 |
| Alumina trihydrate (Additives) | 100 | 200 | 150 | 300 | 200 | 200 | 0 | 100 | 200 | 150 |
| Radical initiator | | | | | | | | | | |
| *6 | 1 | 1 | 1 | 1 | 1 | 1 | 1 | 1 | 1 | 1 |
| *7 | 1 | 1 | 1 | 1 | 1 | 1 | 1 | 1 | 1 | 1 |
| Mold releasing agent | 1 | 1 | 1 | 1 | 1 | 1 | 1 | 1 | 1 | 1 |
| {Glass roving} | | | | | | | | | | |
| Number of pieces | 30 | 30 | 20 | 20 | 25 | 25 | 30 | 30 | 25 | 25 |
| Content (volume %) | 60 | 60 | 40 | 40 | 50 | 50 | 60 | 60 | 50 | 50 |
| {Results} | | | | | | | | | | |
| Fiber patterns | No | No | No | No | No | No | Yes | Yes | Yes | Yes |
| Warping | No | No | No | No | No | No | Yes | Yes | Yes | Yes |
| Oxygen index | 70< | 70< | 70< | 70< | 70< | 70< | 30> | 70< | 70< | 70< |

Notes:
See Notes to Table 3 regarding liquid resins and mold releasing agent;
*6: bis(4-t-butyl cyclohexyl)peroxy dicarbonate;
*7: t-butyl peroxy benzoate;
Glass roving: ER440OF-183 (trade name of Nippon Electric Glass Co., Ltd.);
Glass roving content: Volume % inside in-mold cured product.

What is claimed is:

1. A polymerizable composition comprising unsaturated urethane shown by Formula (1) given below, vinyl monomer which is copolymerizable with said unsaturated urethane, and an inorganic powder filler at weight ratio of (unsaturated urethane)/(vinyl monomer)=10/90–90/10, said inorganic powder filler being 30–300 weight parts with respect to 100 weight parts of the sum of said unsaturated urethane and vinyl monomer:

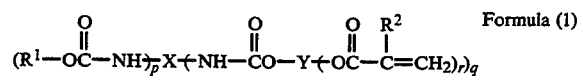

$$(R^1-OC-NH)_{\overline{p}}X(NH-CO-Y(OC-C=CH_2)_r)_q \quad \text{Formula (1)}$$

where X is a residual group obtained by removing isocyanate groups from polyisocyanate; Y is a residual group obtained by removing hydroxyl groups from polyol; $R^1$ is a residual group obtained by removing hydroxyl group from non-radical polymerizable monool having aliphatic hydrocarbon group with 6–22 carbon atoms; $R^2$ is H or $CH_3$; and p, q and r are each an integer 1–3 such that $2 \leq p+q \leq 4$ and $qr \geq 2$.

2. The polymerizable composition of claim 1 containing 100–300 weight parts of said inorganic powder filler for 100 weight parts of the sum of said unsaturated urethane and said vinyl monomer.

3. The polymerizable composition of claim 2 wherein said inorganic powder filler comprises alumina trihydrate.

4. An in-mold cured product using the polymerizable composition of claim 1.

5. An in-mold cured product using the polymerizable composition of claim 2.

6. An in-mold cured product using the polymerizable composition of claim 3.

7. The in-mold cured product of claim 4 which is reinforced with reinforcing fibers.

8. The in-mold cured product of claim 5 which is reinforced with reinforcing fibers.

9. The in-mold cured product of claim 6 which is reinforced with reinforcing fibers.

10. The in-mold cured product of claim 7 containing said reinforcing fibers by more than 30 volume %.

11. The in-mold cured product of claim 8 containing said reinforcing fibers by more than 30 volume %.

12. The in-mold cured product of claim 9 containing said reinforcing fibers by more than 30 volume %.

13. The in-mold cured product of claim 7 produced by pultrusion.

14. The in-mold cured product of claim 8 produced by pultrusion.

15. The in-mold cured product of claim 9 produced by pultrusion.

16. The in-mold cured product of claim 10 produced by pultrusion.

17. The in-mold cured product of claim 11 produced by pultrusion.

18. The in-mold cured product of claim 12 produced by pultrusion.

* * * * *